3,134,228
PROPULSION SYSTEM
John Wolansky, Willowick, and Thomas P. O'Grady, Wickliffe, Ohio, assignors to Thompson Ramo Wooldridge, Inc., Cleveland, Ohio, a corporation of Ohio
Filed July 27, 1961, Ser. No. 127,177
2 Claims. (Cl. 60—39.55)

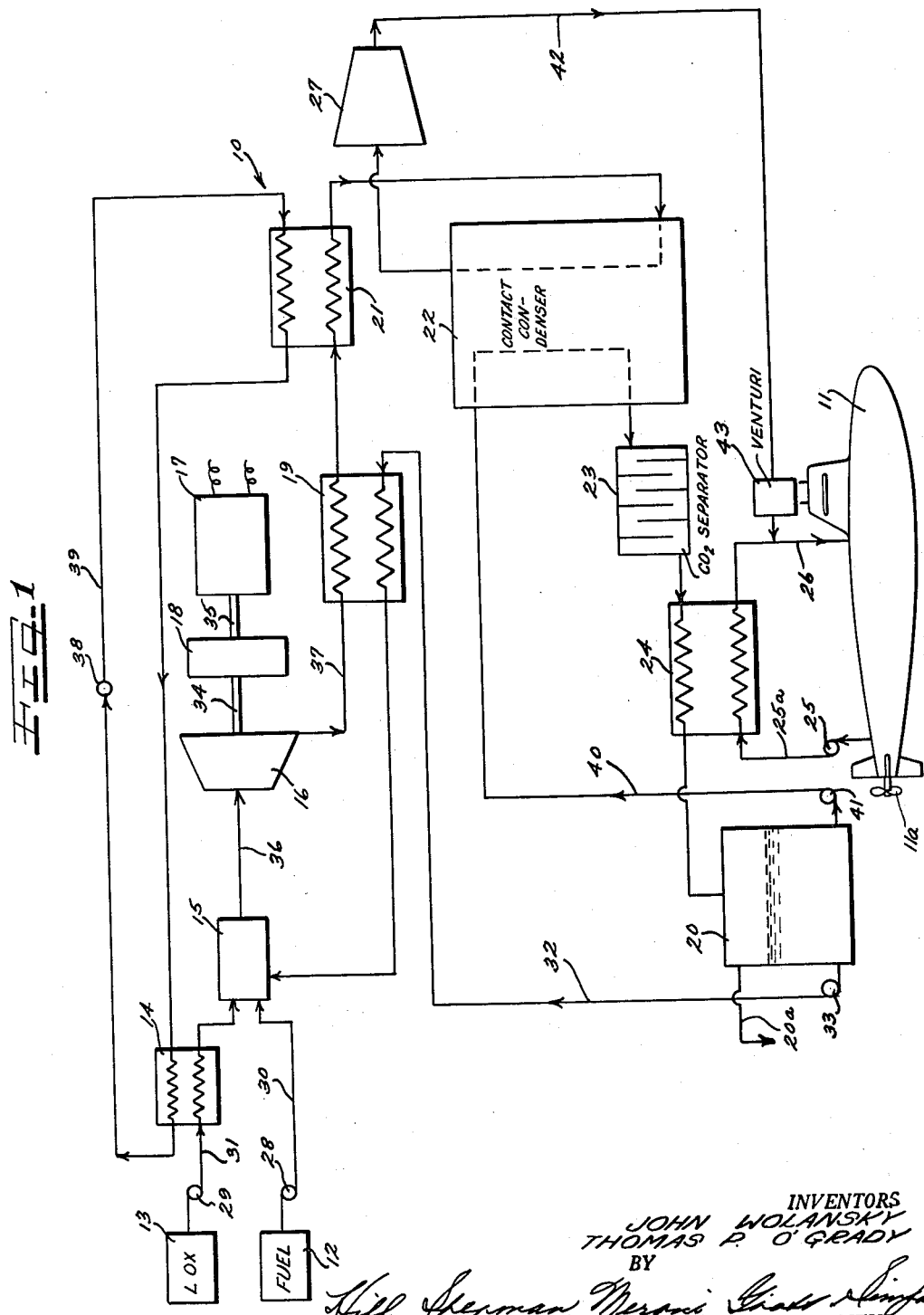

This invention relates to a propulsion system for vehicles such as submarines and the like, and more particularly to a non-air breathing propulsion system which is exceptionally efficient and compact.

Requirements for propulsion systems for submarines and the like present rigorous criteria including the capability of operating at submerged depths for extended periods of time, and such systems must be compact, relatively silent and have fuel consumption and other characteristics compatible with normal submarine limitations.

Thus storage space in the vehicle must be adequate for oxidant storage, inasmuch as air is not available for combustion processes during submerged operation. Also, since system discharge pressure is a direct function of submerged depth, a high-system pressure, or a forced flow exhaust system, is necessary. Again, in order to prevent surface wake formation with subsequent vehicle detection, the system exhaust product should be water soluble. And because of the inherent limitations on fuel storage capacity, a relatively high propulsion system efficiency must be provided in order to satisfy vehicle mission requirements. Further, it is desirable that the system be adapted for use with a fuel which is both economical and readily available.

The present invention satisfies the above criteria, requirements and standards and provides a propulsion system which is non-air breathing and so is particularly adapted to an underwater environment. The system of the invention utilizes a combination of fuel, liquid oxygen and water diluent, as contrasted with previously available propulsion devices of similar type which have used hydrogen peroxide as the oxidant source. The system is further characterized by a flow pattern wherein the liquid oxygen and fuel are pressurized to a high degree and introduced into a combustion chamber for high temperature combustion, the diluent being introduced into the combustion chamber at a correspondingly high pressure to reduce the resultant gas temperature at the combustion chamber exit whereby the power element, which may be a turbine or a displacement engine, will hold up for long life. The high system pressures render the device efficient despite the back-up pressures involved in submarine operation, and for relatively back-up pressures, an exhaust compressor may be utilized in the system.

In order to obtain optimum cycle efficiency, the exhaust heat from the turbine or other power means is utilized to preheat the diluent and the oxidant, preferably by means of a closed nitrogen system.

The exhaust products include carbon dioxide and steam, and since the steam undergoes a change of phase as it passes through the system the resultant water may be recycled for use as diluent and may be used in condensation of the steam, although condensation is also effected by the ambient fluid, e.g., sea water. Thus, the condensed water with entrained carbon dioxide is passed through a carbon dioxide entrainment separator and the condensate is then passed through a sea water heat exchanger into storage means from which it may be pumped to serve as diluent as stated. Thereby, a very efficient, partially closed diluent cycle is achieved, and further in accordance with the invention, the separated carbon dioxide is exhausted from the system preferably through the seat water exit piping of the last mentioned heat exchanger so that the exhaust gases are dissolved in the sea water piping before being pumped out of the submarine, the exhaust gas passing through a perforated Venturi to decrease its bubble size prior to being dissolved in the sea water piping. Accordingly, the possibility of a detectible wake is minimized. In this connection it may be noted that an inherent exhaust muffling is effected by passing the exhaust gas sequentially through heat exchangers and the steam condenser.

Accordingly, it is an object of the present invention to provide a propulsion system for underwater vehicles and the like which is characterized by a direct combustion process, thereby eliminating the need for a decomposition chamber such as is required with the hydrogen peroxide Walther cycle system shown and described on pages 79 and 80 of the January 1947 issue of Power Plant Engineering.

Another object of the invention is to provide a propulsion system as described which affords a significant increase in thermal efficiency over comparable systems because of the optimal use therein of the exhaust gas regenerative heat potential.

Another object of the invention is to provide a propulsion system as described which has a much higher system pressure than comparable systems, thereby reducing the volume requirement for system components, eliminating the need for an exhaust compressor for back-pressure conditions within a predetermined range of ambient pressure and correspondingly reducing the system sensitivity to increased back-pressure conditions.

Another object of the invention is to provide a propulsion system as described having a higher system temperature than the Walther cycle system, thereby to produce higher specific work output and to reduce the exhaust gas flow as well as the sea water requirement.

Another object of the invention is to provide a propulsion system utilizing liquid oxygen so that propellant consumption is reduced and less volume is taken up for fuel storage for performing a given mission. Correspondingly, liquid oxygen is considerably less expensive than the hydrogen peroxide used in the Walther cycle, thereby affording a much more economical power plant.

Another object of the invention is to provide a propulsion system wherein the amount of water which must be pumped overboard is markedly reduced as compared with a conventional system using hydrogen peroxide as the oxidant. Thus with the semi-closed cycle of the invention, the amount of flow that must be exhausted from the system is less than in an open cycle propulsion system.

Another object of the invention is to provide a propulsion system which is non-air breathing, with resultant advantages in applications such as submerged operation in a submarine.

Another object of the invention is to provide a propulsion system which is much quieter, and easier to silence, than conventional reciprocating engines or other comparable systems, as the result of the cycling of the exhaust through heat exchanger and muffling means.

Another object of the invention is to provide a propulsion system which is more compact than conventional reciprocating diesel engines or the like.

Another object of the invention is to provide a propulsion system capable of burning a variety of fuels.

Another object of the invention is to provide a system as described which, in one embodiment thereof, utilizes an exhaust compressor to afford operation at very high back pressures corresponding to the great depths encountered in a submarine application.

Another object of the invention is to provide a system having a self-contained, and regenerative water system as described, to eliminate the need for large diluent water storage capacity.

Another object of the invention is to provide a propulsion system having a closed nitrogen loop to preheat the liquid oxygen, thereby to afford a higher cycle thermal efficiency.

Another object of the invention is to provide a propulsion system having a high pressure and turbine inlet temperature steam condition as compared with conventional propulsion system designs thereby affording an increase in efficiency of operation.

Yet another object of the invention is to minimize the possibility of creating a detectible exhaust gas wake, both by minimizing the exhaust gas volume and by dissolving the gas in sea water prior to its discharge from the system.

Other objects and advantages of the invention will become apparent as the description proceeds in accordance with the drawings, in which:

FIGURE 1 is a diagrammatic view of a propulsion system according to the present invention.

Referring now to the drawings, a propulsion system 10 is shown according to the present invention which is particularly adapted for use with underwater vehicles such as the submarine, indicated diagrammatically at 11 having a conventional propeller 11a, by virtue of its non-air breathing characteristic, although the system is not limited to such use.

The system 10 includes a supply of fuel 12, a supply of liquid oxygen 13, a heat exchanger 14 to vaporize the liquid oxygen and a combustor or combustion chamber 15. A power means 16, which may be a multi-stage, impulse type turbine or a displacement engine, is driven from the exhaust products of the combustor 15 and drives a generator 17 through a gear drive 18, in the example shown. The propulsion system 10 thus provides for driving a propeller by electrical means through the generator 17, or permits direct energization of a propeller by means of the turbine 16 and shaft 34, as understood by those skilled in the art. The propulsion system 10 also includes a heat exchanger 19 for heating diluent to be introduced to the combustor 15 from a water storage tank 20 as hereinafter described; and a heat exchanger 21 for heating a liquid having a lower boiling point than the liquid oxygen, to vaporize the liquid oxygen in the heat exchanger 14. A direct contact steam condenser or gas cooler 22 is provided to condense the bulk of the steam not condensed in the heat exchangers 19 and 21, and a carbon dioxide entrainment separator 23 is connected with the direct contact steam condenser 22. A heat exchanger 24 is disposed between the entrainment separator 23 and the water storage tank 20, and is provided with a sea water inlet pump 25 and an outlet 26 releasing the sea water and carbon dioxide from the condenser 22. An exhaust compressor 27 may be provided in the system for use at great depths.

The fuel in the fuel supply 12 may be diesel oil, although any other fuel such as gasoline, kerosene, JP–4, JP–5, etc., may be used. In accordance with the invention, the oxidant in the supply source 13 is liquid oxygen, so as to provide a compact, non-air breathing system which does not require a decomposition chamber. The liquid oxygen may be stored at substantially $-297°$ F., and 30 p.s.i.a. The fuel and liquid oxygen are pumped up to a pressure of substantially 2500 p.s.i.a. by pumps 28 and 29 and introduced into the combustor 15 through conduits 30 and 31 as hereinafter further described. In a suitable example, combustion takes place in the combustion chamber 15 at approximately 5500° F. Water is introduced into the combustor 15, also at 2500 p.s.i.a., through a conduit 32 leading from the water storage tank 20, as pumped by a pump 33. The water acts as a diluent, reducing the gas temperature at the combustor exit to 1500° F., or to a temperature at which the turbine materials for the turbine or power plant 16 will hold up for long life.

As noted previously, however, the power plant may be a displacement type engine. Also, the output shaft 34 of the turbine may directly drive a propeller or the like rather than the generator 17, or be applied in other ways as understood by those skilled in the art. And the gear drive 18, which drives the generator 17 at a reduced rate of speed through the shaft 35, may be dispensed with in particular applications.

In a typical example of fuel used in accordance with the present invention, the following chemical reaction for combustion in the combustion chamber 15 occurs:

$$C_{12}H_{22} + 17.5 O_2 \rightarrow 12 CO_2 + 11 H_2O$$

In this example, there is 17% by weight of carbon dioxide in the combustion product with the remainder being steam.

This combustion mixture is passed to the turbine or power plant 16 through a conduit means 36 and in the form shown, wherein the turbine is a multi-stage, impulse type turbine, the mixture exits from the turbine into a conduit 37, at a pressure which is close to the expectable ambient pressure in a typical application, e.g., 125 p.s.i.a.; and at an exhaust temperature of substantially 1040° F., in the example described, turbine inlet pressure being 2300 p.s.i.a.

In order to obtain optimum cycle efficiency, the exhaust heat is utilized to preheat the diluent water and the liquid oxygen. Thus the heat exchanger 19 preheats the water from the storage tank 20 from a temperature of 100° F., to 625° F. in the example indicated, with the turbine exhaust mixture then dropping to a temperature of 344° F. (corresponding to a partial pressure of 125 p.s.i.a.). Thereby a partial change of phase in the mixture is produced, with 16% water being formed.

In order to vaporize the liquid oxygen prior to its introduction into the combustor 15, a fluid is used for the heat exchanger 14 which has a boiling point less than the boiling point of the liquid oxygen. For this purpose, a closed nitrogen system is utilized and the carbon dioxide, water and steam combination produced in the heat exchanger 19 is passed through the heat exchanger 21 in order to utilize the turbine exhaust gas itself to preheat the liquid oxygen and thereby increase the system efficiency and decrease fuel consumption. A small blower 38 is provided in the closed circuit 39 for the nitrogen and the nitrogen is circulated through the heat exchanger 21, where it is heated by the exhaust mixture described from 60° F. to 230° F. The high temperature nitrogen is then passed through the heat exchanger 14 where it heats the liquid oxygen from its liquid state of $-297°$ F. to its gaseous state, at 32° F. Concurrently, the nitrogen temperature drops to 60° F. Although nitrogen is preferred for the closed system for vaporizing liquid oxygen, because its boiling point ($-320°$ F.) is lower than the boiling point of oxygen, thereby assuring a gaseous nitrogen system under all conditions, and because this material is particularly applicable for submarines, it will be appreciated that other materials and means for accomplishing the vaporization are encompassed within the scope of the invention.

The steam in the exhaust mixture is further condensed in the heat exchanger 21 and the entrained water in both the heat exchangers 19 and 21 is drained into a line leading to the direct contact steam condenser 22, the steam-water and carbon dioxide combination passing into the direct contact steam condenser through the line 37 in the example shown. The direct contact steam condenser 22, which is sometimes referred to as a gas cooler, condenses the bulk of the water out of the turbine exhaust mixture at a temperature which may be 250° F. This cooling of the exhaust gas is achieved in a closed water loop cooled by external means, which in the example described is sea water. Thereupon, the carbon dioxide together with a certain amount of entrained water is exhausted from the system, as hereinafter further described.

The condensed water is passed at 250° F., in the example given, to the carbon dioxide entrainment separator 23, which separates out the carbon dioxide entrained in the condensed water. This carbon dioxide is also exhausted from the system. The resultant condensate is passed through the heat exchanger 24 where it is cooled, in this example, to 100° F. Cooling for this purpose is preferably accomplished by pumping sea water from outside the submarine 11 through a conduit 25a by means of the pump 25. The sea water, which for illustrative purposes may be considered as entering the heat exchanger 24 at a temperature of 60° F., is thereupon exhausted from the system at a temperature which may then be indicated as 135° F. This outlet is represented by the reference numeral 26, and is continuous with the conduit 25a in the form shown. After passing through the heat exchanger 24, as described, and being cooled by the sea water circulated through conduit 25a, the condensate is stored in the storage tank 20, which may have an overflow conduit 20a.

An advantage of the propulsion system 10 is that there may actually be more water condensed from the exhaust mixture than is needed in the recirculating system, as hereinabove set forth. The surplusage produced is therefore available for use elsewhere in the system, or may be dumped overboard. As previously noted, a portion of the water is pumped up to a pressure of 2500 p.s.i.a. by the pump 33 and injected into the combustion chamber 14 to provide the diluent, whereupon it is recirculated through the system as described.

Further in accordance with the invention, a second conduit 40 leads from the storage tank 22 and the water is pumped from the ambient pressure (e.g. 125 p.s.i.a.) by a pump 41 to a pressure of, for example, 225 p.s.i.a., or a pressure sufficient to carry this water through the contact steam condenser 22, entrainment separator 23 and the heat exchanger 24, back to the water tank 20, in a closed loop which is effective to provide the condensation of the turbine exhaust steam described.

An advantage of the relatively high pressures utilized in the system 10 is that under ordinary operating conditions the carbon dioxide leaving the direct contact steam condenser 22 may be passed to the outlet 26 through the conduit extension 42 or otherwise released without the need for an exhaust compressor. Also, conduit extension 42 is internally connected to the sea water exit piping 26 so that the exhaust gases are dissolved in the sea water piping between the heat exchanger and the submarine hull 11 before being pumped out of the submarine. Further to this end, the exhaust gas is passed through a perforated Venturi diagrammatically indicated at 43 to decrease the bubble size and effect maximum absorption and solution of the carbon dioxide. Thereby, the hazard of a detectible wake is minimized.

For very high pressure requirements, the exhaust compressor 27 may be connected in the line 42 to pump the carbon dioxide leaving the direct contact steam condenser 22 up to a suitable exhaust pressure before it is exhausted from the system. The exhaust compressor 27 assures a constant turbine exit pressure so that the turbine efficiency is constant despite variation in system back pressures. However, it will be appreciated that the embodiment wherein the exhaust compressor is dispensed with has the advantage under ordinary operating conditions that less power will be required than is needed where the exhaust compressor is provided, thereby increasing overall system efficiency.

A further advantage of the invention resides in the inherent exhaust muffling afforded by the heat exchangers 19 and 21, as well as by the direct contact steam condenser 22. The high speed turbine 16 which may be used as the power means in the propulsion system 10 may also be shock mounted and sound insulated to preclude transmission of structural and air-borne noise to the hull 11, and it will be appreciated that there is no intake noise produced by the system, such as occurs with conventional gas turbines with their high weight flow and characteristic compressor inlet sound.

Accordingly, there has been provided a propulsion system which is optimal in meeting the requirements of high capability for operating at submerged depths for extended periods of time, absence of noise, compactness and low fuel consumption. Storage space requirements are minimized by virtue of the lower amount of fuel needed with the liquid oxygen combustion system of the invention, and the high system pressure, either in itself or as augmented by forced flow exhaust, permits operation at depth without difficulty. And the solubility of the system exhaust products, together with the solution thereof previous to release from the vehicle, minimizes wake formation. The system as a whole, with the regenerating water flow and the regenerating heat cycle thereof, affords a high degree of propulsion efficiency to satisfy vehicle mission requirements. Also the fuel itself is economical and is readily available as needed by virtue of the closed cycle nitrogen system of the invention.

The system 10 affords decisive advantages over the Walther cycle system described in the increase in thermal efficiency derived from optimal use of exhaust gas regenerative heat potential, as afforded by the heat exchange means described and the preheating of diluent and liquid oxygen. As noted, the direct combustion process of the invention eliminates any need for a decomposition chamber such as is required with the Walther cycle system. Further, the higher pressure of the cycle of the invention not only reduces volume requirements for system components and eliminates the need for an exhaust compressor for back pressure conditions of 125 to 200 p.s.i.a., for example, but also generally reduces system sensitivity to increased back pressure conditions. And the relatively high system temperature leads to a higher specific work output and effectively reduces the exhaust gas flow and the sea water coolant requirement, it being noted in the latter instance that the flow is inversely proportional to the coolant temperature rise and that a substantial differential obtains in the present system. Also, the semi-closed cycle of the system reduces the amount of flow that must be exhausted in relation to the amount to be exhausted in an open cycle propulsion system, and the self-contained regenerative water system obviates the need for a large diluent water storage capacity. The nitrogen cycle of the invention not only assures a continuous gas recirculation condition, since the boiling point of the nitrogen is less than that of the liquid oxygen, but the heat exchange means utilized therewith serves to preheat the liquid oxygen and produce a higher cycle thermal efficiency. Thus it will be seen that the system has a broad capability which affords a wide range of applications.

Although we have herein set forth and described our invention with respect to certain specific principles and details thereof, it will be understood by those skilled in the art that these may be varied without departing from the spirit and scope of the invention as set forth in the hereunto appended claims.

We claim as our invention:
1. In an underwater vehicle or the like,
  a power system comprising a supply of liquid oxygen,
  a supply of hydrocarbon fuel,
  a combustor, a first heat exchanger,
  means for communicating liquid oxygen through said first heat exchanger and thence to the combustor in gas phase,
  means for communicating the hydrocarbon fuel to said combustor to be oxidized by the oxygen,
  a supply of diluent,
  a second heat exchanger,
  means for communicating diluent from the supply of diluent to said combustor through said second heat exchanger,
  engine means,
  means communicating combustion products and entrained gasified diluent from said combustor to said engine means to drive the engine means,
  a third heat exchanger,
  a condenser,
  means communicating exhausted combustion products from the engine means through said second and third heat exchangers to said condenser, said second heat exchanger transmitting heat from the combustion products exhausted from said engine means to the diluent passing to the combustor,
closed conduit means passing through the first and third heat exchangers and circulating nitrogen therethrough to transmit heat from the exhausted combustion products to the liquid oxygen,
conduit means leading condensed diluent from the condenser to the supply of diluent,
conduit means transmitting diluent from the supply of diluent to the condenser to effect condensation therein,
said conduit means transmitting diluent forming a condensing loop with the conduit means leading to the supply of diluent,
a fourth heat exchanger in said conduit means leading from said condenser to said diluent supply, means circulating ambient fluid into and out of the vehicle and through said fourth heat exchanger to cool condensate returning to said diluent supply,
means communicating with the ambient fluid circulating means and passing combustion products from the engine through the condenser to said ambient fluid circulating means, and
Venturi means in the means communicating with the ambient fluid for reducing bubbles and to thereby substantially entrain the combustion products in the ambient fluid prior to release from the vehicle.

2. In an underwater vehicle or the like,
a power system comprising a supply of liquid oxygen,
a supply of hydrocarbon fuel,
a combustor, a first heat exchanger,
means for communicating liquid oxygen through said first heat exchanger and thence to the combustor in gas phase,
means for communicating the hydrocarbon fuel to said combustor to be oxidized by the oxygen,
a supply of diluent,
a second heat exchanger,
means for communicating diluent from the supply of diluent to said combustor through said second heat exchanger,
engine means,
means communicating combustion products and entrained gasified diluent from said combustor to said engine means to drive the engine means,
a third heat exchanger,
a condenser,
means communicating exhausted combustion products from the engine means through said second and third heat exchangers to said condenser,
said second heat exchanger transmitting heat from the combustion products exhausted from said engine means to the diluent passing to the combustor,
closed conduit means passing through the first and third heat exchangers and circulating nitrogen therethrough to transmit heat from the exhausted combustion products to the liquid oxygen,
conduit means leading condensed diluent from the condenser to the supply of diluent,
conduit means transmitting diluent from the supply of diluent to the condenser to effect condensation therein,
said conduit means transmitting diluent forming a condensing loop with the conduit means leading to the supply of diluent,
a fourth heat exchanger in said conduit means leading from said condenser to said diluent supply,
a carbon dioxide entrainment separator for entrained carbon dioxide in said conduit means leading from said condenser to said diluent supply,
said carbon dioxide entrainment separator being disposed between said fourth heat exchanger and said condenser,
means circulating ambient fluid into and out of the vehicle and through said fourth heat exchanger to cool condensate returning to said diluent supply,
means communicating with the ambient fluid circulating means and passing combustion products from the engine through the condenser to said ambient fluid circulating means, and
Venturi means in the means communicating with the ambient fluid for reducing bubbles and to thereby substantially entrain the combustion products in the ambient fluid prior to release from the vehicle.

References Cited in the file of this patent

UNITED STATES PATENTS

| | | |
|---|---|---|
| 1,310,253 | Shuman | July 15, 1919 |
| 1,688,761 | Sperry | Oct. 23, 1928 |
| 2,351,750 | Fawkes | June 20, 1944 |
| 2,402,826 | Lubbock | June 25, 1946 |
| 2,431,132 | Malina et al. | Nov. 18, 1947 |
| 2,469,678 | Wyman | May 10, 1949 |
| 2,722,100 | Goddard | Nov. 1, 1955 |
| 2,787,121 | Bonffart | Apr. 2, 1957 |

FOREIGN PATENTS

| | | |
|---|---|---|
| 149,388 | Great Britain | Aug. 11, 1920 |

OTHER REFERENCES

Africano: Journal of the American Rocket Society, No. 33, March 1936.

Power Plant Engineering article, January 1947 issue, pages 79–80.

Howard et al.: "Generation of Electric Power Space Vehicles by Means of a Cryogenic Fuel Powered Engine," a paper presented at the A.I.E.E. meeting, June 24, 1959.